United States Patent
Gudino Carrizales

(10) Patent No.: US 11,128,225 B2
(45) Date of Patent: Sep. 21, 2021

(54) DC-TO-DC CONVERTER AND METHOD FOR OPERATING A DC-TO-DC CONVERTER

(71) Applicant: Robert Bosch GmbH, Stuttgart (DE)

(72) Inventor: Emiliano Gudino Carrizales, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/343,026

(22) PCT Filed: Oct. 2, 2017

(86) PCT No.: PCT/EP2017/074986
§ 371 (c)(1),
(2) Date: Apr. 18, 2019

(87) PCT Pub. No.: WO2018/072987
PCT Pub. Date: Apr. 26, 2018

(65) Prior Publication Data
US 2020/0052602 A1 Feb. 13, 2020

(30) Foreign Application Priority Data
Oct. 18, 2016 (DE) .................... 10 2016 220 354.1

(51) Int. Cl.
*H02M 3/335* (2006.01)
(52) U.S. Cl.
CPC ... *H02M 3/33592* (2013.01); *H02M 3/33507* (2013.01)

(58) Field of Classification Search
CPC ............ H02M 3/22; H02M 3/24; H02M 3/28; H02M 3/315; H02M 3/3155; H02M 3/325;
(Continued)

(56) References Cited

U.S. PATENT DOCUMENTS 5,162,982 A  * 11/1992 Mentler .............. H02M 3/3372
                                                              363/134
7,869,237 B1    1/2011 Schutten et al.
(Continued)

FOREIGN PATENT DOCUMENTS

DE      102013207475     10/2014
EP          2562918        2/2013
(Continued)

OTHER PUBLICATIONS

English translation of EP 2562918. (Year: 2013).*
(Continued)

*Primary Examiner* — Thienvu V Tran
*Assistant Examiner* — Carlos O Rivera-Perez
(74) *Attorney, Agent, or Firm* — Michael Best & Friedrich LLP

(57) ABSTRACT

The invention relates to a DC-to-DC converter with reduced losses due to a reverse-recovery-effect. A transformer is provided on an input of the DC-to-DC converter. Due to said transformer, an electric current which is possibly still flowing can be compensated and thus suppressed to enable a current-less commutation by means of said transformer. This allows electric losses due to a reverse-recovery-effect, in particular in a continuous step-up converter, to be reduced or eliminated.

10 Claims, 5 Drawing Sheets

(58) Field of Classification Search
CPC ............. H02M 3/335; H02M 3/33515; H02M 3/33507; H02M 3/33592; H02M 3/33523; H02M 3/3353; H02M 3/33538; H02M 3/33546; H02M 3/33553; H02M 3/33569; H02M 3/33576; H02M 3/33584; H02M 3/158; H02M 3/1588; H02M 2001/0016–0022; H02M 2001/0048; H02M 2001/0051; H02M 2001/0054; H02M 2001/0067; H02M 2001/007; H02M 1/14; H02M 1/143; H02M 1/15; H02M 1/44; H02M 1/08; H02M 1/083; H02M 2007/4815; H02M 2007/53878; H02M 7/42; H02M 7/44; H02M 7/4826; H02M 7/521; H02M 7/537; H02M 7/523; H02M 7/5233; H02M 7/53838; H02M 7/5387; H02M 7/53871; H02M 7/66; H02M 7/68; H02M 7/575; H02M 1/34; H02M 2001/0058; H02M 2001/342–348; H02M 2007/48; H02M 2007/4811; H02M 7/4807; H02M 1/0016–0022; H02M 1/0048; H02M 1/0051; H02M 1/0054; H02M 1/0058; H02M 1/0067; H02M 1/007; H02M 1/342–348; H02M 7/4811; H02M 7/48; H02M 7/4815; H02M 7/53878; Y02T 10/70; Y02T 10/72; Y02T 10/92; B60L 58/20; B60L 2210/10; B60Y 2200/91; B60Y 2200/92; Y02B 70/10
USPC ........... 363/15–21.18, 40–48, 65, 89, 95–99, 363/123–127, 131–134; 323/222–226, 323/271–275, 282–288, 351
See application file for complete search history.

(56) References Cited

U.S. PATENT DOCUMENTS

| | | | | |
|---|---|---|---|---|
| 7,944,713 | B2* | 5/2011 | Cheung | H02M 3/158 363/16 |
| 2006/0176719 | A1 | 8/2006 | Uruno et al. | |
| 2007/0236966 | A1 | 10/2007 | Uruno et al. | |
| 2014/0133190 | A1* | 5/2014 | Asinovski | H02M 3/33592 363/21.03 |
| 2019/0027950 | A1* | 1/2019 | Carrizales | B60L 3/0046 |

FOREIGN PATENT DOCUMENTS

| | | |
|---|---|---|
| JP | 2003111407 A | 4/2003 |
| JP | 2003164149 | 6/2003 |
| JP | 2015177559 A | 10/2015 |
| KR | 20150049060 | 5/2015 |
| WO | 99025059 A1 | 5/1999 |

OTHER PUBLICATIONS

International Search Report for Application No. PCT/EP2017/074986 dated Mar. 6, 2018 (English Translation, 3 pages).

* cited by examiner

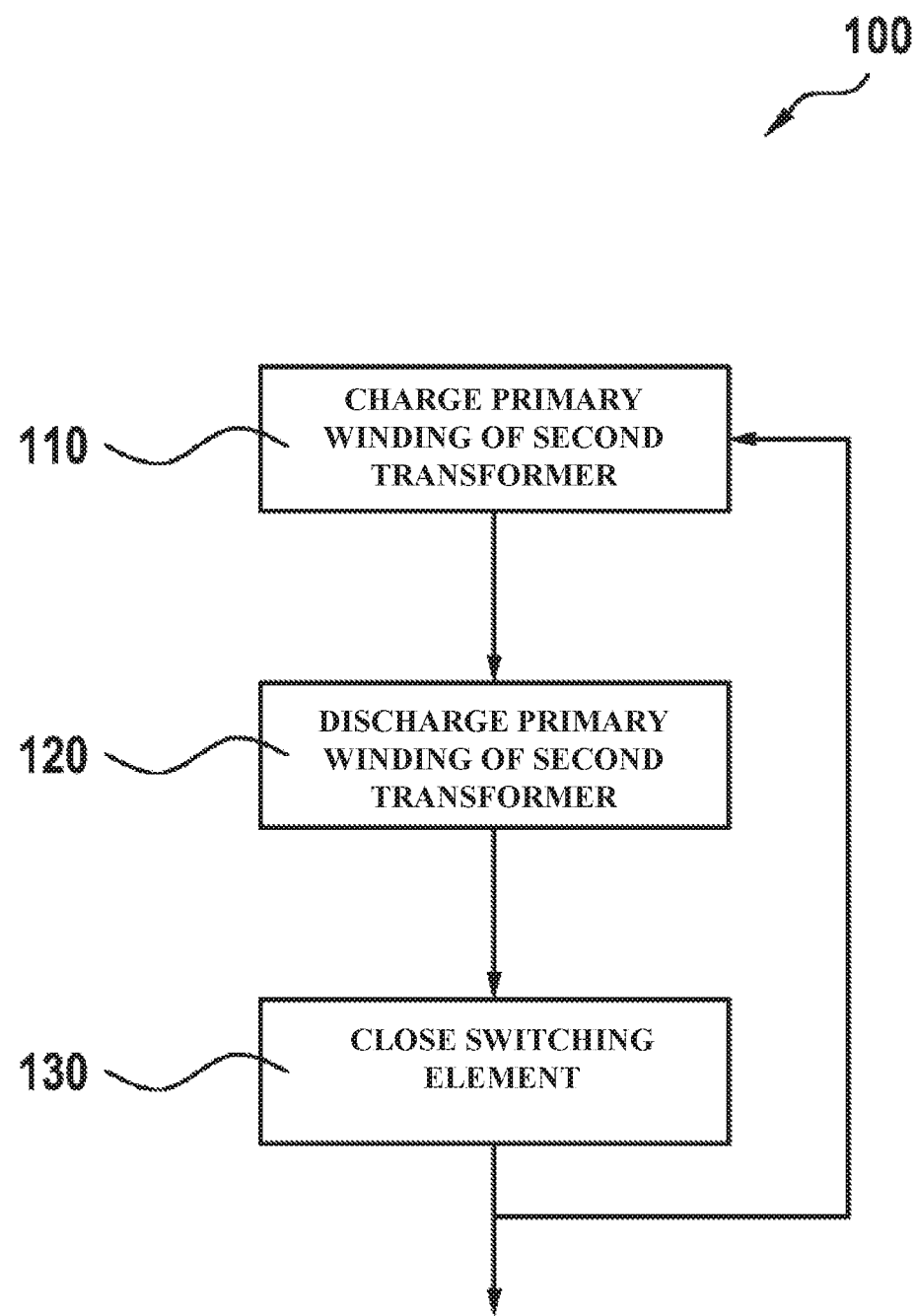

DC-TO-DC CONVERTER AND METHOD FOR OPERATING A DC-TO-DC CONVERTER

BACKGROUND OF THE INVENTION

The present invention relates to a DC-to-DC converter and to a method for operating a DC-to-DC converter.

In electric or hybrid vehicles, electrical energy can be transmitted between a high-voltage network and a low-voltage network. In order to achieve the requisite galvanic isolation for this purpose, single-phase phase-shifted full-bridge (PSFB) DC-to-DC converters, for example, can be employed. DC-to-DC converters of this type can be operated bidirectionally, i.e. electrical energy can be transmitted from the low-voltage network to the high-voltage network, and from the high-voltage network to the low-voltage network.

Document DE 10 2013 207 475 A1 discloses a DC-to-DC converter with a phase-shifted full-bridge. The inverter comprises two half-bridges, each having two semiconductor switches. The two half-bridges are connected on the output side to a primary winding of a transformer. A secondary winding of the transformer is connected to a rectifier. The DC-to-DC converter comprises a control unit, which is connected to the control inputs of the semiconductor switches, wherein the control unit actuates the half-bridges for the generation of an AC voltage. The control unit is designed to switch a semiconductor switch to a conductive state at a voltage zero-crossing, or in conjunction with a minimum voltage value of the voltage across the semiconductor switch.

SUMMARY OF THE INVENTION

The present invention discloses a DC-to-DC converter, and a method for operating a DC-to-DC converter.

Accordingly, the following is provided:

A DC-to-DC converter having an inverter, a first transformer, a rectifier and a compensating device. The first transformer comprises a primary winding and a secondary winding. The inverter is electrically coupled at an input to a first input terminal and a second input terminal of the DC-to-DC converter. An output of the inverter is electrically coupled to the primary winding of the first transformer. The rectifier is coupled on its input side to the secondary winding of the first transformer. On the output side, the rectifier is electrically coupled to a first output terminal and a second output terminal of the DC-to-DC converter. The compensating device comprises a second transformer and a switching element. The second transformer comprises a primary winding and a secondary winding. The primary winding of the second transformer is arranged between the first input terminal of the DC-to-DC converter and a terminal of the input of the inverter. A series circuit comprised of the switching element of the compensating device and the secondary winding of the second transformer is further arranged between the first input terminal and the second input terminal of the DC-to-DC converter.

The following is further provided:

A method for operating a DC-to-DC converter according to the invention, comprising steps for the charging of the primary winding of the second transformer in the compensating device, and the subsequent discharging of the primary winding of the second transformer in the compensating device. The method further comprises a step for the closing of the switching element in the compensating device for a predetermined time interval. The closing of the switching element of the compensating device is executed at the end of the step for the discharging of the primary winding of the second transformer. The above-described steps can be repeated as many times as may be required.

The switching elements of a DC-to-DC converter, specifically of a phase-shifted full-bridge DC-to-DC converter, depending upon the output power, are generally hard-wired. Turn-on and turn-off losses can occur in the switching elements of the DC-to-DC converter accordingly. Moreover, depending upon the voltages present in the DC-to-DC converter, a "reverse-recovery" effect can occur. This means that, during a commutating process of the electric current in the DC-to-DC converter, a diode in the current path may not immediately assume the blocking voltage, but rather the diode is conductive for a short period, even though a negative voltage is present (i.e. in opposition to the forward direction of the diode). As a result, short and very high current pulses can occur in the diode. These current pulses are associated with very high losses. Conventional body diodes, of the type employed in combination with semiconductor switching elements, are not generally designed for this type of operating mode. There is consequently a risk that, in the event of long-term duty, components will be damaged, or the service life of the DC-to-DC converter will at least be significantly impaired.

The basic principle of the present invention is therefore to take account of the above-described knowledge and provide a DC-to-DC converter which can eliminate, or at least reduce, the negative influences associated with the above-described reverse-recovery effect. By means of the DC-to-DC converter according to the invention and the corresponding operating method, the reverse-recovery effect, specifically in the rectifier diodes of a DC-to-DC converter, can be reduced to a minimum. It is thus possible to employ the DC-to-DC converter, even in step-up and continuous duty. Specifically, step-up and continuous duty of this type can also be achieved using conventional body diodes for the semiconductor switching elements employed.

By the minimization of the reverse-recovery effect, the DC-to-DC converter can be continuously employed as a step-up converter. The maximum transmittable output power is no longer limited by losses associated with the turn-off of the semiconductor diodes. Specifically, the DC-to-DC converter can thus be permanently employed as a step-up converter in continuous duty. Improved efficiency of the step-up converter in continuous duty can also be achieved. Moreover, in this type of duty, the DC-to-DC converter according to the invention also exhibits significantly improved properties with respect to electromagnetic compatibility.

According to one form of embodiment of the DC-to-DC converter, the compensating device further comprises a diode. This diode is arranged in combination with the switching element of the compensating device and the secondary side of the second transformer in a series circuit between the first input terminal and the second input terminal of the DC-to-DC converter. In this manner, it can be ensured that the compensating device only compensates a directly-flowing current, with no resulting current injection in the opposing direction.

According to one form of embodiment, the switching element of the compensating device comprises a metal-oxide field-effect transistor (MOSFET). Transistors of this type are particularly suitable for use as switching elements.

According to one form of embodiment, the compensating device is designed to close the switching element of the compensating device for a predetermined time interval before an electric current is commutated in the rectifier of the DC-to-DC converter. By the closing of the switching element in the compensating device, any electric current flowing in the inverter can be rapidly suppressed as a result of the coupling between the primary winding and the secondary winding of the second transformer.

The primary winding and the secondary winding of the second transformer are inversely interconnected.

According to one form of embodiment, the inverter of the DC-to-DC converter comprises two half-bridges, each having two semiconductor switches. Inverter topologies of this type are particularly appropriate for the DC-to-DC converter according to the invention. As semiconductor switches, for example, MOSFETs or insulated-gate bipolar transistors (IGBTs) can be employed. A "body diode" can be arranged in parallel with the switching element.

According to one form of embodiment, the rectifier of the DC-to-DC converter comprises an active synchronous rectifier. Specifically, the active synchronous rectifier can be constituted by semiconductor switching elements having a parallel-connected body diode. Active synchronous rectifiers have a very high level of efficiency. Moreover, in a configuration of this type, the DC-to-DC converter can also be operated in the inverse direction. MOSFETs, for example, can also be employed to constitute the rectifier.

According to one form of embodiment of the method for operating the DC-to-DC converter, the charging of the primary winding of the second transformer in the compensating device comprises the provision of an electrical connection between the terminals of the inverter input. The electrical connection can be achieved, for example, by the closing of all the switching elements in the inverter.

According to one form of embodiment, the step for the discharging of the primary winding of the second transformer in the compensating device comprises the provision of an electrical connection by means of the primary winding of the first transformer. Specifically, the polarity of the voltage applied to the primary winding of the first transformer can thus be inverted in two sequential discharging processes.

According to one form of embodiment, the predetermined time interval during which the switching element of the compensating device is respectively closed is a maximum 400 ns. Depending upon the application, the maximum time interval can also be as short as 200 ns or, where applicable, as short as 100 ns.

The above-mentioned configurations and further developments can be mutually combined as required, insofar as this is appropriate. Further configurations, further developments and implementations of the invention also include combinations, which are not explicitly mentioned, of features of the invention which are described heretofore or hereinafter with reference to the exemplary embodiments. Specifically, a person skilled in the art will also add individual aspects, by way of improvements or additions, to the respective basic forms of the invention.

BRIEF DESCRIPTION OF THE DRAWINGS

The present invention is explained in greater detail hereinafter with reference to the exemplary embodiments represented in the schematic figures of the drawings. In the figures:

FIG. 5: shows a schematic representation of a flow diagram, constituting the basis of a method for operating a DC-to-DC converter according to one form of embodiment.

DETAILED DESCRIPTION

Figure 1:
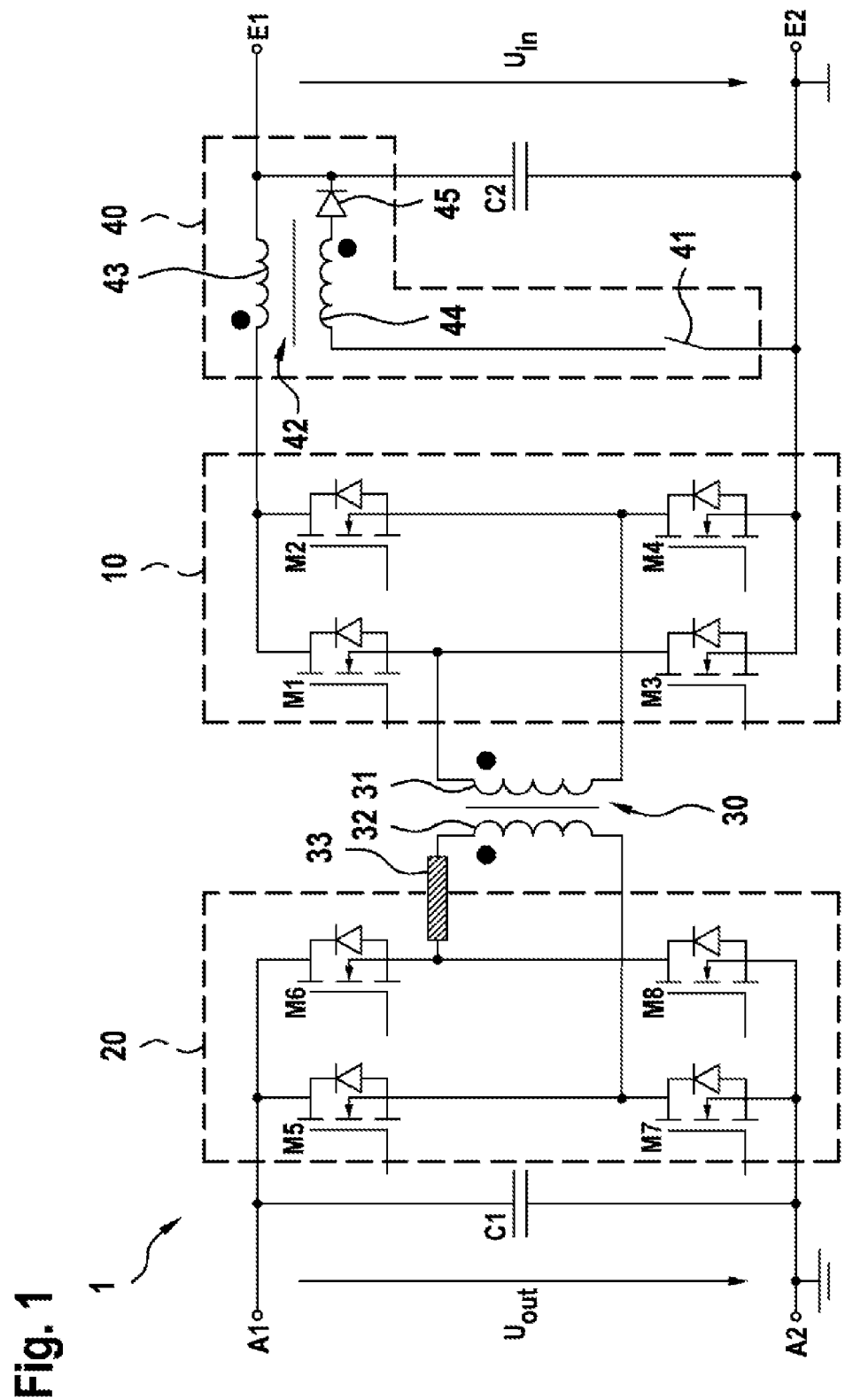
FIG. 1: shows a schematic representation of a block circuit diagram, constituting the basis of a DC-to-DC converter according to one form of embodiment.

FIG. 1 shows a schematic representation of a block circuit diagram, constituting the basis of a DC-to-DC converter 1 according to one form of embodiment. The DC-to-DC converter 1 comprises an inverter 10, a rectifier 20, a first transformer 30 and a compensating device 40. Between a first input terminal E1 and a second input terminal E2 of the DC-to-DC converter 1, a DC input voltage Uin can be applied. For the smoothing or buffering of the DC input voltage Uin, a capacitor C2 can be provided between the first and second input terminals E1, E2. The DC-to-DC converter 1 converts the DC input voltage Uin into a further DC voltage, and provides this converted DC voltage as a DC output voltage Uout between the first output terminal A1 and the second output terminal A2. A capacitor C1 can also be provided between the first output terminal A1 and the second output terminal A2. Specifically, the DC output voltage Uout can be higher than the DC input voltage Uin.

The DC-to-DC converter 1 can additionally comprise further components, elements or subassemblies. In the interests of clarity, however, these are not described here.

The inverter 10 can, for example, comprise two half-bridges, each having two semiconductor switching elements M1 to M4. A first switching element M1 can be arranged between an upper node point and a first terminal of the primary winding 31 of the first transformer 30. A second switching element M2 can be provided between the upper node point and a second terminal of the primary winding 31 of the first transformer 30. A third switching element can be provided between the first terminal of the primary winding 31 of the first transformer 30 and the second input terminal E2. Finally, a fourth switching element M4 can be provided between the second terminal of the primary winding 31 of the first transformer 30 and the second input terminal E2. As semiconductor switches, for example, MOSFETs or insulated-gate bipolar transistors (IGBTs) can be employed. A body diode can be arranged in parallel with each switching element.

The rectifier 20 of the DC-to-DC converter 1 can be configured as an active synchronous rectifier. Specifically, the rectifier 20 can be configured analogously to the inverter 10 in the form of two half-bridges, each having two semiconductor switching elements M5 to M8. A first switching element M5 of the DC-to-DC converter can be provided between a first output terminal of the DC-to-DC converter and a first terminal of the secondary winding 32 of the transformer 30. A second switching element M6 of the DC-to-DC converter can be provided between the first output terminal A2 and a second terminal of the secondary winding 32 of the transformer 30. A third switching element M7 can be provided between a second output terminal A2 and the first terminal of the secondary winding 32 of the transformer 30. Finally, a fourth switching element M8 can be provided between the second output terminal A2 and the second terminal of the secondary winding 32 of the transformer 30. Between one node point, which interconnects the second switching element M6 and the fourth switching element M8 of the rectifier 20, and the second terminal of the secondary winding 32 of the transformer 30, an inductance 33 can be provided. Alternatively, this inductance 33 can also be constituted by the stray inductance of the transformer 30.

The compensating device 40 of the DC-to-DC converter 1 comprises a second transformer 42 and a switching element 41. The compensating device 40 can further comprise a diode 45. A primary winding 43 of the second transformer 42 of the compensating device 40 is arranged between the first input terminal E1 and an input terminal of the inverter 10. The switching element 41 of the compensating device 40 is arranged between the second input terminal E2 and a terminal of the secondary winding 44 of the second transformer 42 of the compensating device 40. The second terminal of the secondary winding 44 of the second transformer 42 of the compensating device 40 is connected, where applicable via the diode 45, to the first input terminal E1 of the DC-to-DC converter 1.

The operating principle of the DC-to-DC converter 1 is described in greater detail hereinafter, with reference to FIGS. 2 to 4. A DC input voltage Uin applied between the first input terminal E1 and the second input terminal E2 is to be converted into a higher DC output voltage Uout between the first output terminal A1 and the second output terminal A2.

Figure 2:
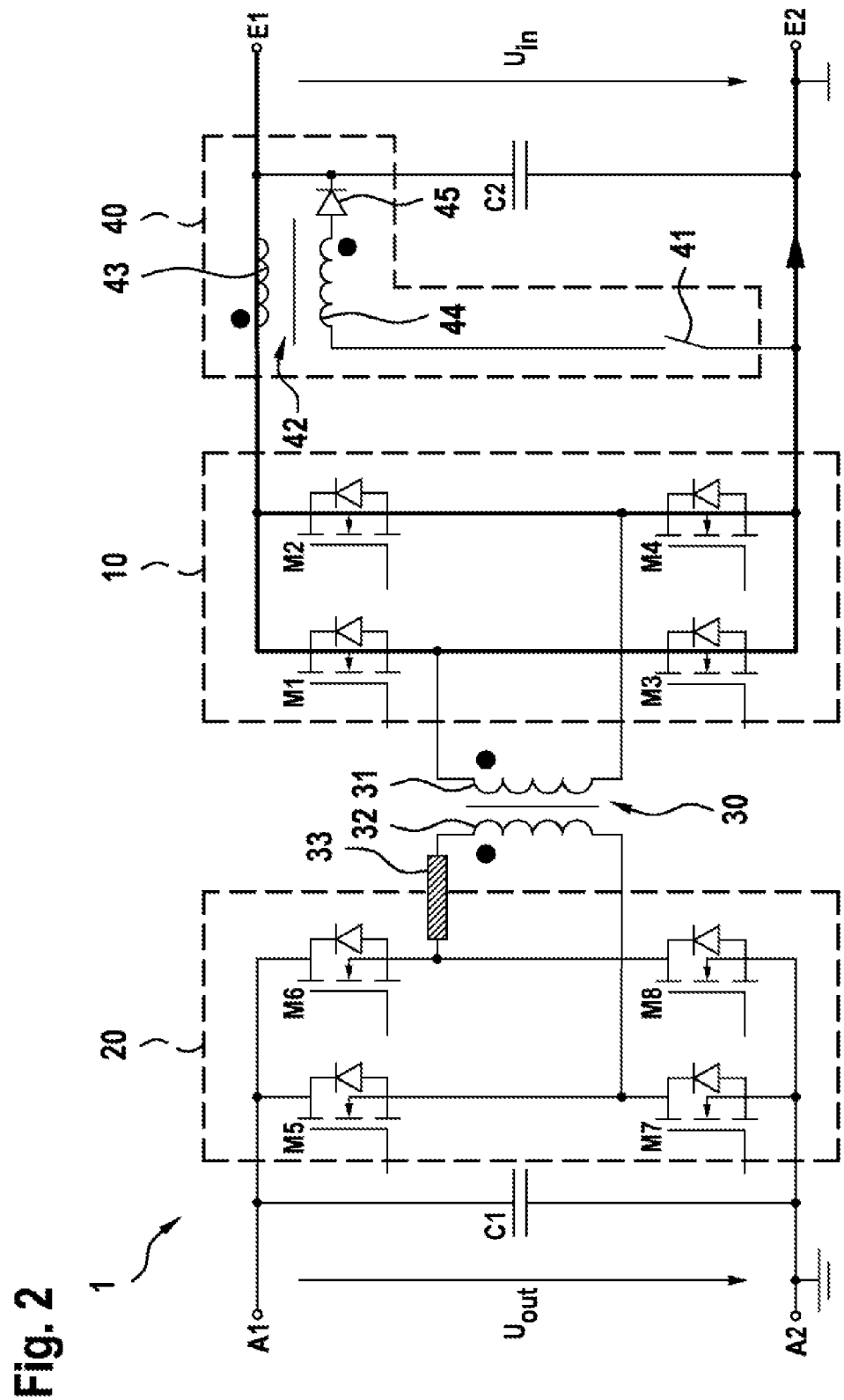
FIGS. 2 to 4: show schematic representations of current paths in a DC-to-DC converter according to one form of embodiment.

FIG. 2 firstly illustrates a first step, in which the four switching elements M1 to M4 of the inverter 10 are closed. As can be seen from the current path represented in bold in FIG. 2, an electric current flows from the first input terminal E1 through the primary winding 43 of the second transformer 42 of the compensating device 40 via the four switching elements M1 to M4 of the inverter to the second input terminal E2. While this current flow is established, energy is stored in the primary winding 43 of the second transformer 42 of the compensating device 40. This step is consequently described as "charging".

Figure 3:
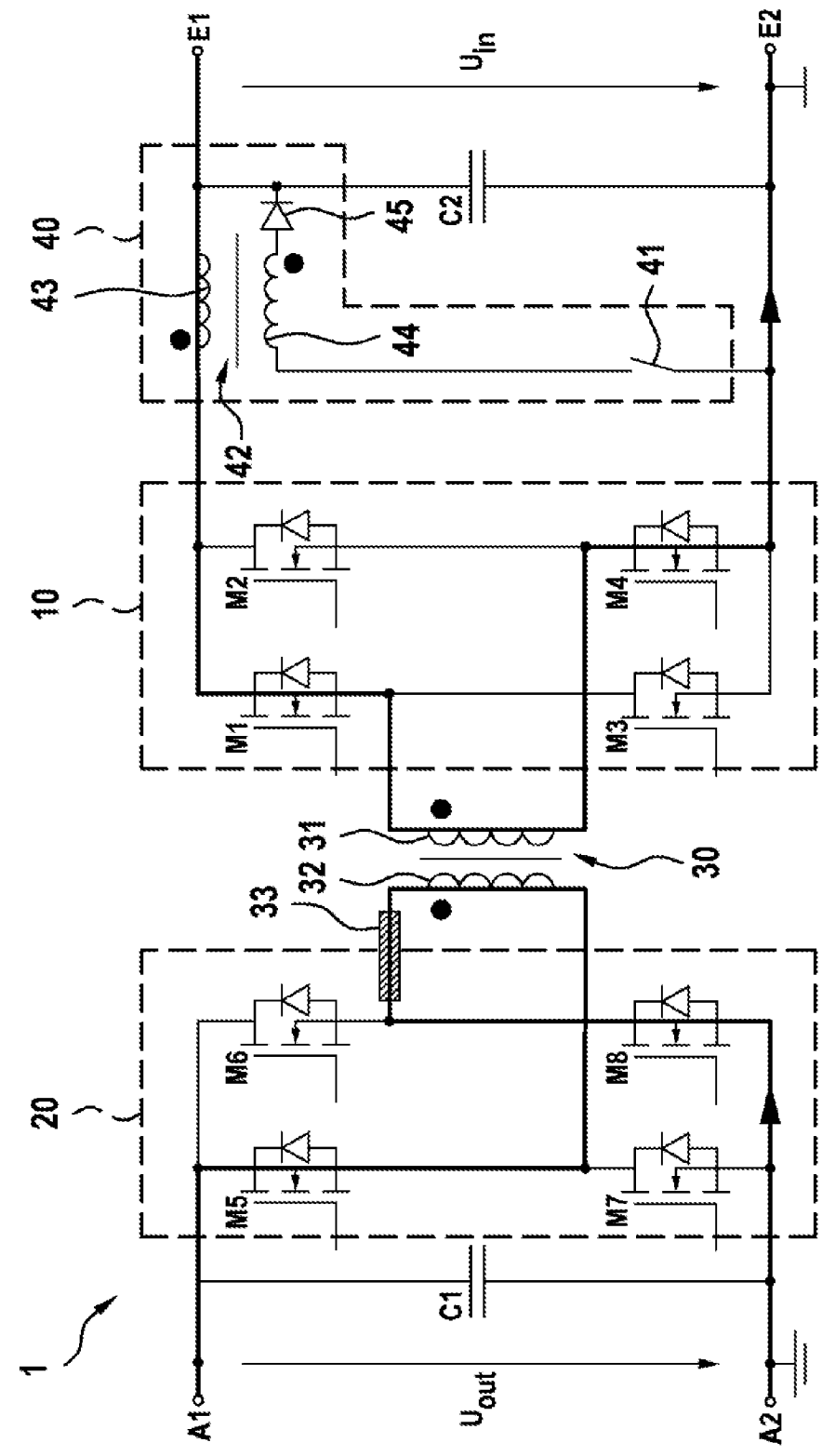

Thereafter, as represented in FIG. 3, two of the four switching elements M1 to M4 of the inverter 10 are opened, such that a flow of electric current through the primary winding 31 of the first transformer 30 is now established. For example, the first switching element M1 and the fourth switching element M4 can be opened, whereas the second switching element M2 and the third switching element M3 remain closed. Alternatively, the second switching element M2 and the third switching element M3 can also be opened, whereas the first switching element M1 and the fourth switching element M4 remain closed. In operational duty, the two switching states just described are generally established in an alternating manner, such that a sequential inversion of the flow of current in the primary winding 31 of the transformer 30 is respectively established. The electric current flowing in the primary winding 31 of the first transformer 30 also induces a flow of electric current in the secondary winding 32 of the transformer 30. By a corresponding actuation of the switching elements M5 to M8 in the rectifier 20 of the DC-to-DC converter 1, the capacitor C1 between the first output terminal A1 and the second output terminal A2 can be charged accordingly. During this process, electrical energy stored in the primary winding 43 of the second transformer 42 of the compensating device 40 is released. This process is consequently described as "discharging".

Discharging is followed by a further charging step, and thereafter by a further discharging step, wherein, in two sequential discharging steps, a respectively inverse flow of current in the primary winding 31 of the first transformer 30 is established.

If the output power of the DC-to-DC converter is low, the electric current flowing in the primary winding 43 of the second transformer 42 of the compensating device 40 falls to 0 A at the end of the discharging process. Accordingly, the body diodes of the switching elements M5 to M8 in the rectifier 20 can be turned off in a de-energized state. This operating mode is described as discontinuous operation.

At higher output powers, the electric current flowing in the primary winding 43 of the second transformer 42 of the compensating device 40 will no longer decay completely to 0 A. This operating mode is described as continuous operation. In this case, the body diodes of the switching elements M5 to M8 in the rectifier 20 can no longer be turned off in a de-energized state. This results in higher losses associated with the reverse-recovery effect.

Figure 4:
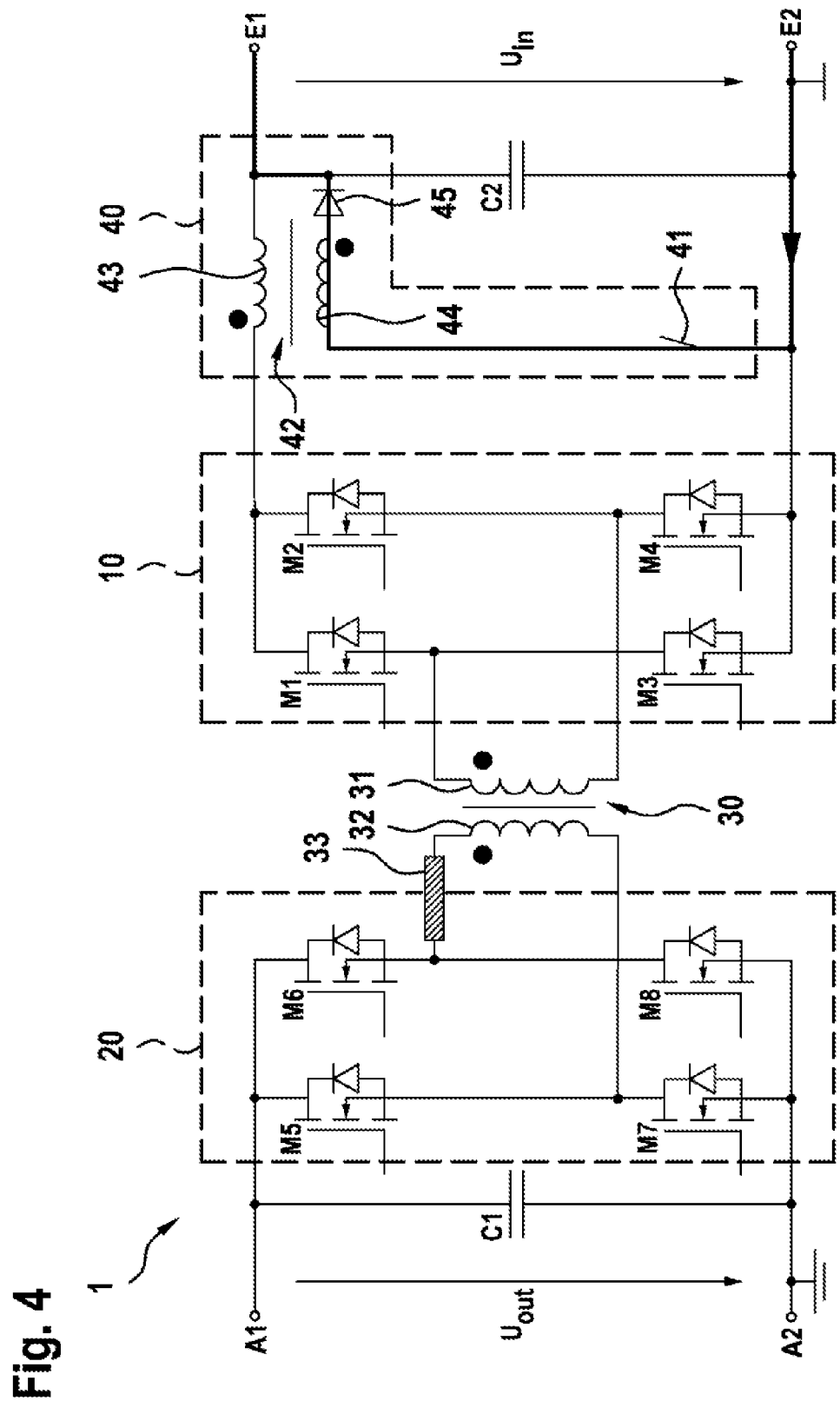

For the prevention or minimization of the reverse-recovery effect, and the losses associated therewith, the switching element 41 of the compensating device 40 is short-circuited for a predetermined time interval at the end of the discharging process, shortly before the switchover to operation in charging mode, as represented in FIG. 4. This operating mode is described as freewheeling mode. The primary winding 43 and the secondary winding 44 of the second transformer 42 of the compensating device 40 thus function as an isolating transformer. The primary winding 43 of the second transformer 42 induces a voltage in the secondary winding 44 of the second transformer 42. As the primary winding 43 and the secondary winding 44 of the second transformer 42 are inversely interconnected, the secondary voltage on the secondary winding 44 counteracts the primary voltage. The magnitude of the secondary voltage can thus be adjusted, according to the transformation ratio between the primary winding 43 and the secondary winding 44 of the second transformer 42. The voltage induced in the secondary winding 44 generates a flow of current, which flows back through the switching element 41, the secondary winding 44 and the diode 45 to the capacitor C2 which is connected between the first input terminal E1 and the second input terminal E2 and/or to a voltage source which is connected to the first input terminal E1 and the second input terminal E2. As electrical energy is fed back in this manner to a connected voltage source, the efficiency of the DC-to-DC converter 1 can also be enhanced.

During the process described above, in freewheeling mode, the electric current flowing in the primary winding 31 of the first transformer 30 falls to approximately 0 A. Energy stored in the stray inductance or in the inductance 33 on the secondary winding 32 of the first transformer 30 is dissipated by the conductive semiconductor components M1 and M4 or M2 and M3 in the DC-to-DC converter 1. The corresponding components can thus be turned off in a de-energized state. In this manner, reverse-recovery losses are reduced to a minimum. Shortly after the switchover to the charging mode described above, the switching element 41 of the compensating device 40 is re-opened, and a further cycle of charging and discharging commences, which again terminates in freewheeling mode.

FIG. 5 shows a schematic representation of a flow diagram, constituting the basis of a method for operating a DC-to-DC converter according to one form of embodiment. Specifically, the method described here can be applied to an above-described DC-to-DC converter 1. In step 110, firstly, the primary winding 43 of the second transformer 42 of the compensating device 40 is charged. Thereafter, in step 120, the primary winding 43 of the second transformer 42 in the compensating device 40 is discharged. Charging 110 and discharging 120 have already been described above. At the end of the discharging process 120, the switching element 41 of the compensating device 40 is closed for a predetermined time interval. The predetermined time interval can, for example, be a maximum 400 ns. Depending upon the application, however, longer or shorter time intervals are also possible, for example 200 ns or 100 ns.

The charging of the primary winding 43 and the subsequent discharging of the primary winding 43 of the second transformer 42 can be repeated regularly during the operation of the DC-to-DC converter 1. At the end of each discharging process 120, closing 130 of the switching element 41 is executed for the above-described freewheeling mode.

In summary, the present invention relates to a DC-to-DC converter having reduced losses associated with a reverse-recovery effect. To this end, a transformer is provided on one input of the DC-to-DC converter. By means of this transformer, for the purposes of de-energized commutation, any residual electric current flowing in the transformer can be compensated, and dissipated accordingly. Specifically during continuous step-up duty, electrical losses associated with a reverse-recovery effect can be reduced or prevented.

The invention claimed is:

1. A DC-to-DC converter (1), having:
 a first transformer (30), with a primary winding (31) and a secondary winding (32);
 an inverter (10), which is electrically coupled at an input to a first input terminal (E1) and a second input terminal (E2) of the DC-to-DC converter (1), and an output of which is electrically coupled to the primary winding (31) of the first transformer (30);
 a rectifier (20), which is coupled on its input side to the secondary winding (32) of the first transformer (30) and, on the output side, is electrically coupled to a first output terminal (A1) and a second output terminal (A2) of the DC-to-DC converter (1); and
 a compensating device (40), having a second transformer (42) and a switching element (41), wherein the second transformer (42) comprises a primary winding (43) and a secondary winding (44), wherein the primary winding (43) of the second transformer (42) is arranged in series with and between the first input terminal (E1) of the DC-to-DC converter (1) and a terminal of the input of the inverter (10), wherein a series circuit comprised of the switching element (41) and the secondary winding (44) of the second transformer (42) is arranged between the first input terminal (E1) and the second input terminal (E2) of the DC-to-DC converter (1), wherein the DC-DC converter (1) is configured to provide an electrical connection via the inverter (10) through the primary winding (31) of the first transformer (30) in the compensation device (40) for discharging the primary winding (43) of the second transformer (42), and wherein the switching element (41) positioned between the second input terminal (E2) and a terminal of the secondary winding (44) of the second transformer (42).

2. The DC-to-DC converter (1) as claimed in claim 1, wherein the compensating device (40) further comprises a diode (45), and wherein a series circuit comprised of the diode (45), the switching element (41) and the secondary winding (44) of the second transformer (42) is arranged between the first input terminal (E1) and the second input terminal (E2) of the DC-to-DC converter (1).

3. The DC-to-DC converter (1) as claimed in claim 1, wherein the switching element (41) of the compensating device (40) comprises a metal-oxide field-effect transistor, MOSFET.

4. The DC-to-DC converter (1) as claimed in claim 1, wherein the compensating device (40) is designed to close the switching element (41) for a predetermined time interval before an electric current is commutated in the rectifier (20).

5. The DC-to-DC converter (1) as claimed in claim 1, wherein the inverter (10) comprises two half-bridges, each having two semiconductor switches (M1 M4).

6. The DC-to-DC converter (1) as claimed in claim 1, wherein the rectifier (20) comprises an active synchronous rectifier.

7. A method (100) for operating the DC-to-DC converter (1) as claimed in claim 1, comprising the following steps:
 charging (110) of the primary winding (43) of the second transformer (42) in the compensating device (40);
 discharging (120) of the primary winding (43) of the second transformer (42) in the compensating device (40);
 closing (130) of the switching element (41) in the compensating device (40) for a predetermined time interval, at the end of the discharging of the primary winding (43) of the second transformer (42); and
 repetition of the above-mentioned steps.

8. The method (100) as claimed in claim 7, wherein the charging (110) of the primary winding (43) of the second transformer (42) in the compensating device (40) comprises the provision of an electrical connection between the terminals of the input of the inverter (10).

9. The method (100) as claimed in claim 7, wherein the discharging (120) of the primary winding (43) of the second transformer (42) in the compensating device (40) comprises the provision of the electrical connection by means of the primary winding (31) of the first transformer (30).

10. The method (100) as claimed in claim 7, wherein the predetermined time interval comprises a maximum time interval of 400 nanoseconds.

* * * * *